United States Patent [19]

Albright

[11] 3,901,896

[45] Aug. 26, 1975

[54] PROCESS OF OXIDATION OF PRIMARY AND SECONDARY ALCOHOLS TO THE CORRESPONDING CARBONYL DERIVATIVES

[75] Inventor: Jay Donald Albright, Nanuet, N.Y.

[73] Assignee: American Cyanamid Company, Stamford, Conn.

[22] Filed: July 27, 1973

[21] Appl. No.: 383,418

[52] U.S. Cl.... 260/288 B; 260/287 A; 260/288 CF; 260/397.3; 260/590; 260/591; 260/598; 260/599
[51] Int. Cl............................................. C07c 35/34
[58] Field of Search........ 260/288 R, 288 B, 287 A, 260/598, 599, 591

[56] References Cited
UNITED STATES PATENTS 3,215,698   11/1965   Shavel et al..................... 260/288 B
3,364,219   1/1968   Albright.......................... 260/287 A

OTHER PUBLICATIONS

Albright et al.; Jour. of the Amer. Chem. Soc.; Vol. 89, pp. 2416–2423, 1967.
Pfitzner et al.; Synthetic Methods; Vol. 19, p. 307, 1963.
Makuva et al.; Synthetic Methods; Vol. 14, p. 317, 1957.

Primary Examiner—Donald G. Daus
Assistant Examiner—Mary C. Vaughn
Attorney, Agent, or Firm—Ernest y. Miller

[57] ABSTRACT

The process of oxidizing primary and secondary alcohols by reaction with lower dialkyl sulfoxides and halides or sulfonic acid anhydrides to produce the corresponding carbonyl compounds is described. The process is useful in preparing keto compounds where the corresponding hydroxyl compounds are available.

11 Claims, No Drawings

PROCESS OF OXIDATION OF PRIMARY AND SECONDARY ALCOHOLS TO THE CORRESPONDING CARBONYL DERIVATIVES

DESCRIPTION OF THE INVENTION

This invention relates to novel processes for the oxidation of chemical compounds and more particularly, to an improved method for the oxidation of primary and secondary alcohols to the corresponding carbonyl compounds.

Various methods are known in the prior art for oxidizing primary and secondary alcohols to the corresponding carbonyl compounds, however, in many instances the known methods are unsuccessful, proceed in poor yields or use expensive oxidizing agents. In addition, a number of procedures are based on dimethyl sulfoxide such as dimethyl sulfoxide-acetic anhydride or dimethyl sulfoxide-carboiimide which is a more expensive reagent.

In accordance with this invention, we have found that a mixture of a dialkyl sulfoxide and a halide or anhydride such as one of the following; a lower alkanoyl halide, an aroyl halide ($C_7$–$C_8$), haloaroyl halide, a lower alkylsulfonyl halide or arylsulfonyl halide, a lower alkylsulfonic anhydride, an arylsulfonic anhydride or cyanuric chloride is an effective reagent for the oxidation of primary and secondary alcohols. The reaction may be illustrated as follows: R-OH + dialkylsulfoxide + halide or anydride → R=O wherein R is an organic compound. Suitable dialkyl sulfoxides which may be employed in the novel process of the present invention are those wherein the alkyl groups are those having up to 4 carbon atoms, such as diethyl sulfoxide, dipropyl sulfoxide, ethylbutyl sulfoxide and the like. The term "dialkyl sulfoxide" also includes cyclic alkylene sulfoxides such as, for example, tertrametnylene sulfoxide, pentamethylene sulfoxide, hexamethylene sulfoxide and the like.

Aroyl ($C_7$–$C_8$) halides contemplated by the present invention are benzoyl, o, m and p-methoxybenzoyl, also haloaroyl ($C_7$) halides such as o, m and p-chlorobenzoyl, o, m and p-bromobenzoyl, 2,4-dimethylbenzoyl, 2,4-dichlorobenzoyl and the like. Suitable aryl groups of the arylsulfonic anhydrides contemplated by the present invention are phenyl, tolyl, p-halophenyl, o, m and p-methoxyphenyl and the like.

Lower alkyl groups contemplated for the lower alkanoyl halides, lower alkyl sulfonyl halides and lower alkyl sulfonic anhydrides are methyl, ethyl, propyl or butyl.

The method for carrying out the reaction is mild and in general gives few by-products. Temperature control is desirable for reagents such as benzoyl chloride, acetyl chloride, p-toluenesulfonic anhydride, methanesulfonic anhydride, p-toluenesulfonyl-chloride react exothermically with dimethyl sulfoxide at about 25°C. the reactions therefore are run at −10°C. to −50°C. for 3–25 hours in solvents such as, for example, dichloromethane and hexamethylphosphoramide or mixtures of dichloromethane and hexamethylphosphoramide. Carbon tetrachloride, alcohol-free chloroform, tetrachloroethane and other similar inert solvents such as xylene and toluene may be used. At the completion of the reaction, a tertiary alkyl amine such as trimethylamine, triethylamine or N,N-diisopropylethylamine is added and the product isolated by the usual techniques.

For example, the product may be recovered by pouring the reaction mixture into ice and water and filtering off the precipitated product. Alternatively, the product may be extracted with a water immiscible solvent from the mixture after pouring into ice and water.

The method of oxidizing alcohols to the corresponding carbonyl compounds by the present process is in general applicable to all primary and secondary alcohols. Examples of such alcohols which may be employed are aliphatic alcohols such as alkanols, alkenols, alkynols, aralkyl alcohols, aralkenyl alcohols, aralkynl alcohols, polyhydric alkanols, polyhydric alkenols and polyhydric alkynols, alicyclic alcohols such as cycloalkyl, cycloalkenyl, cycloalkynyl, steroid, terpene and polyterpene, alicyclic alkyl alcohols, alicyclic alkenyl alcohols, alicyclic alkynyl alcohols, heterocyclic alcohols, heterocyclic alkyl alcohols, heterocyclic alkenyl alcohols, heterocyclic alkynyl alcohols and the like.

With allylic alcohols or benzylic alcohols the preferred reagents are a dialkyl sulfoxide and a lower alkyl sulfonic anhydride or an aryl sulfonic anhydride for with reagents containing a halide such as aroyl halides and cyanuric chloride allylic halides or benzylic halides may be formed.

Specific examples of alcohols which may be oxidized are β-phenylethanol, cyclobutanol, cyclopentanol, cyclohexanol, cyclooctanol, menthol, p-nitrobenzyl alcohol, benzyl alcohol, cyclohexylmethanol, 1-adamantylmethanol, testosterone, hydrocortisone 21-acetate, chlorestanol, corticosterone 21-acetate, coprostanol, epicoprostanol, ergosterol, epiandrosterone, androsterone, spongenins such as hecogenin, tigogenin and samogenin, bile acids such as lithocholic acid, chlolic acid, cholanic acid, allocholanic acid and bufocholanic acid, periplogenin, digitozigenin, strophanthidin, bufotalin and sarmentogenin.

In the prostaglandin field 7-[3a-alkoxy-2β-(3α-alkoxy-1-octenyl)-5α-hydroxy-1α-cyclopentyl]-5-heptenoic acid derivatives may be oxidized to 7-[3α-alkoxy-2β-(3α-alkoxy-1-octenyl-5-oxo-1α-cyclopentyl]-5-heptenoic acid derivatives where the alkoxy groups are tetrahydropyranyl ether moieties or other protective alkoxy functions capable of reconversion to a hydroxy group. Intermediates for the synthesis of prostaglandins such as hexahydro-3α,β-(hydroxymethyl)-2-oxo-2H-cyclopenta[b]furan-4α-yl-4-biphenylcarboxylate may be ozidized to hexahydro-3a,β-formyl-2-oxo-2H-cyclopenta[b]furan-4α-yl-4-biphenylcarboxylate.

The novel process of this invention is also useful for oxidizing alkaloids containing the sensitive indole moiety. Thus, alkaloids such as yohimbine, β-yohimbine, methylreserpate, α-yohimbine, pseudoyohimbine, ajmaline, tetraphyllicine, yohimbyl alcohol, apoyohimbyl alcohol 16α-methylyohimban-17α-ol, sarpogine, locherine, codeine can be oxidized with a mixture of a dialkyl sulfoxide and one of the following reagents, lower alkanoyl halide, aroyl halides, lower alkylsulfonyl halide, arylsulfonyl halide, lower alkylsulfonic anhydride, arylsulfonic anhydride or cyanuric chloride.

following procedure gives results which are at least equivalent (in yields) to the dimethyl sulfoxide-carbodiimide method of Moffatt described in "Techniques and Applications in Organic Synthesis Oxidation", Vol 2 Augustine and Trecker Ed. Marcel. Dekker, N.Y., N.Y., 1971. The reaction is carried out in hexamethylphosphoramide with excess dimethyl sulfoxide and one equivalent of primary or secondary alcohol and one equivalent of cyanuric chloride at approximately −20°C. At the end of the reaction time of approximately 3 to 20 hours, triethylamine is added and the mixture worked-up after 5 to 10 minutes. This procedure has advantages over the dimethylsulfoxide-carbodiimide method: (1) cyanuric chloride is a cheap reagent compared to N,N'-dicyclohexylcarbodiimide; (2) the toxicity of carbodiimides require care in handling; (3) excess N,N-dicyclohexylcarbodiimide (2 moles) is required in carbodiimide procedure and it can be difficult to remove and the end product, N,N'-dicyclohexylurea, from the product; (4) the cyanuric chloride procedure gives cyanuric acid as end product which under the basic work-up is readily removed as water soluble salt.

The cyanuric chloride procedure is superior to the dimethyl sulfoxide-acetic anhydride procedure of Albright and Goldman, J. Am. Chem. Soc., 87, 4214 (1965) or Ibid. 89 2416 (1967), in the oxidation of primary alcohols since O-acetate by-products may occur in DMSO-Ac$_2$O procedure. Cyanuric chloride gives less desirable yields than DMSO-Ac$_2$O procedure with alkaloid substrates.

With arylsulfonyl halides such as benzenesulfonyl chloride and p-toluenesulfonyl chloride the results are at least equivalent (in yields) to the dimethyl sulfoxide-carbodiimide method and again as with cyanuric chloride are mainly useful for non-allylic alcohols. The results with substrates containing a basic nitrogen atom (alkaloids) often are less satisfactory (in yields and by-products) then the dimethyl sulfoxide-carbodiimide and dimethylsulfoxide-acetic anhydride procedures.

The alkylsulfonic anhydride and arylsulfonic anhydride procedures are at least equivalent (in yields) to the dimethyl sulfoxide-carbodiimide and dimethyl sulfoxide-acetic anhydride methods. Sulfonic anhydrides are less costly than carbodiimides, are less toxic, and like carbodiimides are useful in oxidations of allylic alcohols. The sulfonic anhydrides also give satisfactory yields with substrates containing a basic nitrogen atom such as alkaloids. Sulfonic anhydrides have the advantage of giving water soluble sulfonic acid salts in the work-up.

Acid chlorides such as acetyl chloride and benzoyl chloride with dimethyl sulfoxide in hexamethylphosphoramide oxidize alcohols but give less desirable yields and more by-products than the cyanuric chloride, arylsulfonyl chloride or sulfonic anhydride methods.

SPECIFIC DISCLOSURE

The invention will be described in greater detail in conjunction with the following specific examples showing the specific application of the oxidizing agents of this invention.

EXAMPLE 1

Preparation of Methyl Ketoreserpate

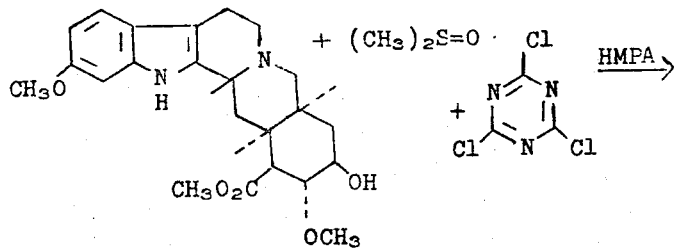

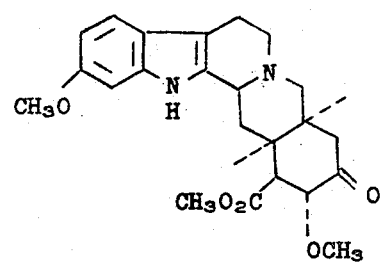

To a mixture of 1.66 g. of methyl reserpate, 6 ml. of dimethyl sulfoxide and 16 ml. of hexamethylphosphoramide chilled to −25° is added 0.74 g. of cyanuric chloride. The mixture is chilled at −20°C. for 6.5 hours and 2.3 ml. of triethylamine added. The mixture is allowed to stand at room temperature for 5 minutes and is poured into ice and water. The mixture is filtered and the solid dissolved in chloroform and filtered through silica gel with chloroform-ethanol (9:1) solvent. The filtrate is concentrated under reduced pressure to give a glass. Crystallization from ethanol gives 0.13 g. of methyl ketoreserpate as light brown crystals, melting point 236°–238°C., dec.

EXAMPLE 2

Preparation of 4-Androstene-3,17-dione

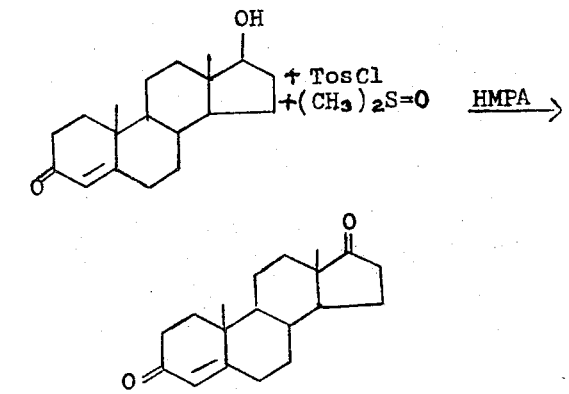

A solution of 2.30 g. (0.0080 mole) of testosterone, 15 ml. of dry hexamethylphosphoramide (HMPA) and 5 ml. of dimethyl sulfoxide is chilled to −5°C. To the solution is added 3.06 g. (0.016 mole) of p-toluenesulfonyl chloride. After stirring at −5°C. for several minutes, the solution is chilled at −20°C. for 5 hours (solid has crystallized from solution). To the chilled mixture is added 4.47 ml. (0.032 mole) of triethylamine. The mixture is stirred at room temperature for 25 minutes and poured into ice and water. The solid is washed with water and once with hexane-ether (9:1) to give 2.16 g. (95%) of tan crystals, melting point 165°–168°C. Recrystallization from hexane-ether gives 1.8 g. (77%) of white crystals, melting point 170°–171°C.

EXAMPLE 3

Preparation of 4-Androstene-3,17-dione

A solution of 2.30 g. (0.0080 mole) of testosterone, 15 ml. of dry dichloromethane and 5 ml. of dimethyl sulfoxide is chilled to −5°C. To the solution is added 3.06 g. (0.016 mole) of p-toluenesulfonyl chloride. After stirring several minutes the solution is chilled at −20°C. for 5 hours. To the solution is added 4.47 ml. (0.032 mole) of triethylamine and the mixture is stirred at room temperature for 25 minutes. Water is added, the organic layer separated and the aqueous layer extracted with chloroform. The organic layer and chloroform extracts are combined, washed with 0.10N sodium hydroxide and with water, dried over magnesium sulfate and concentrated. The residue is extracted with 175 ml. of hot ether, the solution treated with carbon, filtered and the filtrate concentrated to 60 ml. Chilling (−20°C.) and filtering gives 1.52 g. (66%) of white crystals, melting point 163°–165°C.

EXAMPLE 4

Preparation of 4-Androstene-3,17-dione

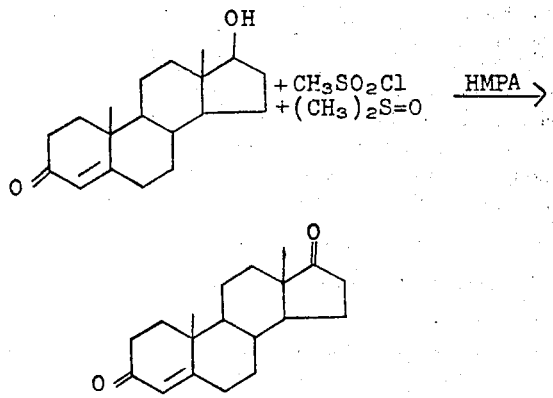

To a solution of 1.15 g. of testosterone and 3 ml. of dimethyl sulfoxide in 8 ml. of hexamethylphosphoramide chilled to −25°C. is added 0.916 g. of methanesulfonyl chloride. The mixture is chilled at −20°C. for 5 hours and 2.3 ml. of triethylamine added. The mixture is allowed to stand at room temperature for 15 minutes and is poured into ice and water. The gum which separated is purified to give 4-androstene-3,17-dione as off-white crystals.

EXAMPLE 5

Preparation of 4-Androstene-3,17-dione

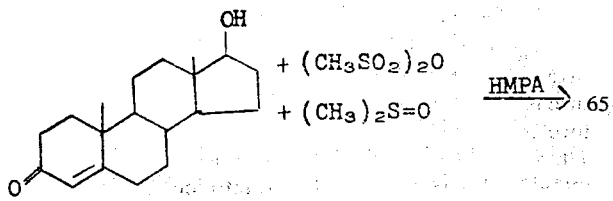

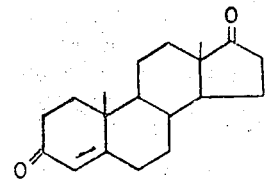

To a solution of 1.15 g. (0.0040 mole) of testosterone in 8 ml. of hexamethylphosphoramide and 3 ml. of dimethyl sulfoxide cooled to −25°C. (dry ice-CCl₄) is added 1.37 g. (0.0080 mole) of methanesulfonic anhydride. The mixture is stirred briefly and stored at −20°C. for 3 hours. To the chilled mixture is added 2.3 ml. (0.016 mole) of triethylamine. The cooling bath is removed and the mixture stirred for 15 minutes. The mixture is poured into ice and water and filtered to give 1.11 g. (99%) of off-white crystals, melting point 168°–180°C. Recrystallization from 8 ml. of ethanol gives 1.0 g. (89%) of white crystals, melting point 170°–171°C.

EXAMPLE 6

Preparation of 4-Androstene-3,17-dione

To a solution of 1.15 g. of testosterone and 3 ml. of dimethyl sulfoxide in 8 ml. of dichloromethane chilled to −25°C. is added 0.916 g. of methanesulfonyl chloride. The solution is chilled at −20°C. for 7 hours and 2.3 ml. of triethylamine added. After 5 minutes the mixture is allowed to stand at room temperature for 10 minutes and concentrated under reduced pressure. To the residue is added ice and water and the mixture extracted with ether. Concentration of the ether gives a gum containing product. Purification gives 4-androstene-3,17-dione as off-white crystals.

EXAMPLE 7

Preparation of 4-Androstene-3,17-dione

To a solution of 1.15 g. (0.0040 mole) of testosterone in 8 ml. of dry dichloromethane and 3 ml. of dry dimethyl sulfoxide chilled to −25°C. (dry ice-CCl₄) is added 1.37 g. (0.0080 mole) of methanesulfonic anhydride. The mixture is stirred 5 minutes and stored at −20°C. for 3.5 hours. To the chilled solution is added 2.3 ml. (0.016 mole) of triethylamine. The cooling bath is removed and the mixture stirred for 5 minutes. The solvent is removed under reduced pressure and ice and water added to the residue. The solid is filtered off and washed with water to give 1.08 g. (96%) of yellow crystals, melting point 156°–159°C. Recrystallization from ether gives 0.91 g. (80%) of pale yellow crystals, melting point 162°–164°C.

EXAMPLE 8

Preparation of p-Nitrobenzaldehyde

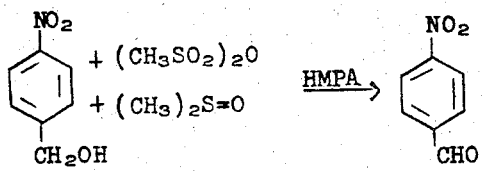

To a solution of 1.23 g. (0.0080 mole) of p-nitrobenzyl alcohol in 15 ml. of hexamethylphosphoramide and 6 ml. of dry dimethyl sulfoxide chilled to −25°C (dry ice-CCl₄) is added 2.74 g. (0.016 mole) of methanesulfonic anhydride. The mixture is stirred 5 minutes and stored at −20°C. for 3.5 hours (solid had separated from solution). To the chilled mixture is added 4.5 ml. (0.032 mole) of triethylamine. The cooling bath is removed, and the mixture stirred for 10 minutes. The mixture is poured into ice and water, filtered and the solid washed with water to give 1.06 g. (88%) of yellow crystals, melting point 101°–103°C.

EXAMPLE 9

Preparation of 4-Nitrobenzaldehyde

To a solution of 1.23 g. (0.0080 mole) of p-nitrobenzyl alcohol in 16 ml. of hexamethylphosphoramide and 6 ml. of dimethyl sulfoxide chilled to −25°C. (dry ice-CCl$_4$) is added 1.48 g. (0.0080 mole) of cyanuric chloride. The mixture is stirred 10 minutes and stored at −20°C. for 5 hours. To the chilled mixture is added 4.5 ml. (0.032 mole) of triethylamine. The cooling bath is removed and the mixture stirred 5 minutes. The mixture is poured into ice and water, filtered and the solid washed with water to give 1.19 g. of yellow crystals. Thinlayer chromatography (silica gel-CHCl$_3$) showed two components, p-nitrobenzaldehyde and p-nitrobenzyl chloride in approximately equal amounts.

EXAMPLE 10

Preparation of 4-Androstene-3,17-dione

To a solution of 1.15 g. (0.0040 mole) of testosterone in 8 ml. of dry hexamethylphosphoramide and 3 ml. of dimethyl sulfoxide chilled to −25°C. (dry ice-CCl$_4$) is added 0.74 g. (0.0040)mole) of cyanuric chloride. The mixture is stirred 5 minutes, (crystals separated) and stored at −20°C. for 4.5 hours. To the chilled mixture is added 2.3 ml. (0.016 mole) of triethylamine. The cooling bath is removed and the mixture is stirred for 5 minutes. The mixture is poured into ice and water, filtered and the solid washed with water to give 1.12 g. (99%) of white crystals, melting point 167-169°C. Thin layer chromatography [silica gel-cyclohexane-ethyl acetate (7:3)]shows trace of faster moving second component.

The use of a greater molar excess of cyanuric chloride (0.0080 mole) gives a less clean product while the use of (0.020 mole) of cyanuric chloride gives incomplete oxidation after 4.5 hours.

EXAMPLE 11

Preparation of 4-Androstene-3,17-dione

To a solution of 1.15 g. (0.0040 mole) of testosterone in 8 ml. of dry hexamethylphosphoramide and 3 ml. of dimethyl sulfoxide chilled to −25°C. (dry ice - CCl$_4$) is added 1.4 g. (0.008 mole) of benzene-sulfonyl chloride. The solution is chilled at −20°C. for 5 hours. To the chilled solution is added 2.3 ml. (0.016 mole) of triethylamine. The cooling bath is removed and the mixture stirred 10 minutes. The mixture is poured into ice and water, filtered and the solid washed with water to give 1.03 g. (91%) of crystals. Recrystallization from ethanol gives 0.77 g. (67%) of pale yellow crystals, melting point 165°–167°C.

EXAMPLE 12

Preparation of Cyclohexanecarboxaldehyde

To a solution of 1.14 g. cyclohexanemethanol and 7.5 ml. of dimethyl sulfoxide in 20 ml. of hexamethylphosphoramide chilled to −25°C. is added 3.8 g. of p-toluenesulfonyl chloride. After 5 hours at −20°C., 5.5 ml. of triethylamine is added after 5 minutes at room temperature the mixture is poured into ice and water.

The mixture is extracted with ether and the ether extracts washed with water, 0.1 N hydrochloric acid and with water. The ether extract is dried over magnesium sulfate and concentrated under reduced pressure to an oil. The oil is chilled and extracted with three 4-ml. portions of hexane. The hexane extract is concentrated under reduced pressure to give the product as a pale yellow liquid.

EXAMPLE 13

Preparation of Yohiminone

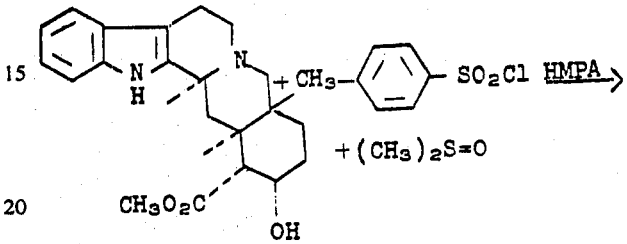

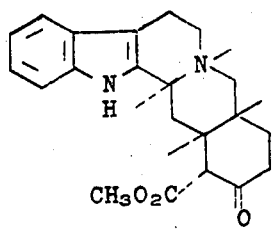

To a mixture of 0.39 g. of yohimbine hydrochloride and 3 ml. of dimethyl sulfoxide in 8 ml. of hexamethylphosphoramide chilled to −25°C. is added 0.38 g. (0.0020 mole) of p-toluenesulfonyl chloride. The mixture is chilled at −20°C. for 44 hours and 0.56 ml. of triethylamine added. After standing 5 minutes at room temperature, the mixture is poured into ice and water and the mixture is filtered. The solid is washed with ethanol and to give yohimbinone as pale yellow crystals.

EXAMPLE 14

Preparation of 4-Androstene-3,17-dione

To a solution of 1.15 g. (0.0040 mole) of testosterone in 8 ml. od dry hexamethylphosphoramide and 3 ml. of dry dimethyl sulfoxide chilled to −25°C. (dry ice-CCl$_4$) is added 0.93 ml. (0.0080 mole) or benzoyl chloride. Within one minute, the solid separates. The mixture is stored at −20°C. for 5 hours. To the chilled mixture is added 2.3 ml. (0.016 mole) of triethylamine. The cooling bath is removed and the mixture stirred for 5 minutes. The mixture is poured into ice and water, filtered and the solid washed with water. Recrystallization from ethanol gives 0.85 g. (75%) of off-white crystals, melting point 1640°–166°C.

EXAMPLE 15

Preparation of 4-Androstene-3,17-dione

To a solution of 1.15 g. (0.0040 mole) of testosterone in 8 ml. of dry hexamethylphosphoramide and 3 ml. of dimethyl sulfoxide chilled to −20°C. (dry ice-CCl$_4$) is added 2.6 g. (0.0080) of p-toluenesulfonic anhydride. After 5 minutes solid precipitates and the mixture is stored at −20°C. for 6 hours. To the chilled mixture is added 2.3 ml. (0.016 mole) of triethylamine. The cooling bath is removed and the mixture stirred 10 minutes. The mixture is poured into ice and water, the

EXAMPLE 16

Preparation of Benzil

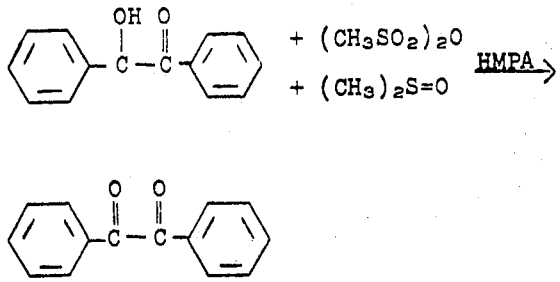

To a solution of 1.06 g. (0.0050 mole) of benzoin in 10 ml. of hexamethylphosphoramide and 4 ml. of dimethyl sulfoxide chilled to −25°C. (dry ice-CCl₄) is added 1.74 g. (0.010 mole) of methanesulfonic anhydride. The mixture is stirred briefly and stored at −20°C. for 5 hours. To the chilled mixture is added 2.77 ml. (0.010) of triethylamine. The cooling bath is removed, and the mixture stirred for 5 minutes. The mixture is poured into ice and water, filtered and the solid washed with water to give 1.04 g. (99%) of yellow crystals, melting point 91°–93°C.

EXAMPLE 17

Preparation of Cyclohexanecarboxaldehyde to a solution of 2.28 g. of cyclohexanemethanol and 15 ml. of dry dimethyl sulfoxide in 40 ml. of dichloromethane cooled to −25°C. is added 3.69 g. of cyanuric chloride. The mixture is chilled at −20°C. for 5 hours and 11 ml. of triethylamine added. The cooling bath is removed and after standing 5 minutes, the mixture washed with water, with dilute hydrochloric acid and with water. The organic phase is dried over magnesium sulfate and concentrated under reduced pressure to give 2.45 g. of product. Purification gives cyclohexanecarboxaldehyde as colorless liquid.

EXAMPLE 18

Preparation of 1-Adamantylcarboxaldehyde

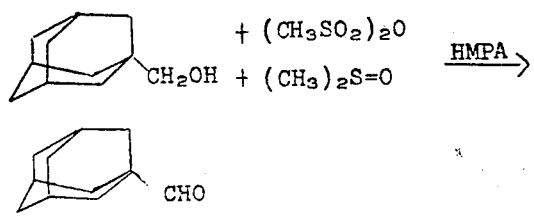

A solution of 0.166 g. (0.0010 mole) of 1-adamantylmethanol in 4 ml. of hexamethylphosphoramide and 1.6 ml. of dimethyl sulfoxide is chilled to −25°C. (dry ice-CCl₄0. To the chilled mixture is added 0.35 g. (0.0020 mole) of methanesulfonic anhydride. The mixture becomes a solid mass and is allowed to warm to −10°C. and stirred to break up solid. The mixture is chilled at −20°C. for 16 hours and 0.55 ml. (0.0040 mole) of triethylamine added. The cooling bath is removed and the mixture stirred for 5 minutes. The mixture is poured into ice and water and extracted with ether. The ether extracts are washed with water, dried over magnesium sulfate and concentrated under reduced pressure to give 0.110 g. (67%) of an oily solid.

EXAMPLE 19

Preparation of Yohimbinone

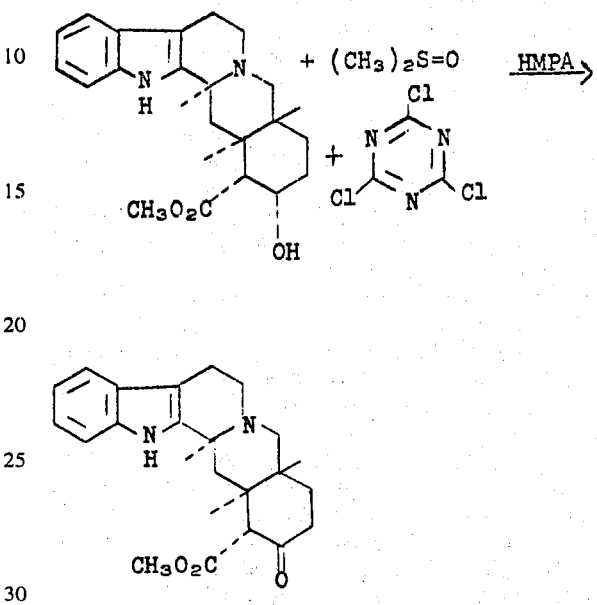

A mixture of 1.06 g. (0.0030 mole) of yohimbine, 8 ml. of hexamethylphosphoramide, 5 ml. of dimethyl sulfoxide and 3 ml. of dichloromethane is chilled to −25°C. (dry ice-CCl₄). To the mixture is added 0.533 g. (0.0030 mole) of cyanuric chloride. The mixture is stirred several minutes and chilled at −20°C. for 7 hours. While chilling 1.66 ml. (0.012 mole) of triethylamine is added. The cooling bath is removed and after 5 minutes the mixture is poured into ice and water. The mixture is filtered and the solid washed with water, with 5% sodium bicarbonate and with water to give 1.03 g. (97%) of tan crystals. Recrystallization from ethanol-chloroform gives 0.58 g. (56%) of yohimbinone as pale yellow crystals, melting point 250°–253°C.

EXAMPLE 20

Preparation of Yohimbinone

To a solution of 0.354 g. (0.0010 mole) of yohimbine, 3 ml. of hexamethylphosphoramide, 1.5 ml. of dimethyl sulfoxide and 1 ml. of dichloromethane chilled to −25°C. is added 0.44 g. (0.0025 mole) of methanesulfonic anhydride. The mixture is stirred 5 minutes and chilled at −20°C. for 7 hours. While chilling 0.7 ml. (0.0051 mole) of triethylamine is added. The cooling bath is removed and after 5 minutes, the mixture is poured into ice and water. Filtration gives 0.338 g. of yohimbinone, melting point 232°–238°C. Recrystallization from ethanol gave product of melting point 249°–251°C.

EXAMPLE 21

Preparation of 4-Androstene-3,17-dione

To a solution of 1.15 g. (0.0040 mole) of testosterone and 3 ml. of dimethyl sulfoxide in 8 ml. of hexamethylphosphoramide chilled to −40°C. is added 0.63 g. (0.0080 mole) of acetyl chloride. The mixture is stirred and then chilled at −20°C. for 6 hours. While chilling 2.3 ml. (0.016 mole) of triethylamine is added. The cooling bath is removed and after 5 minutes, the mixture is poured into ice and water. Filtration gives 1.05 g. of crude product. Purification gives 4-androstene-3,17-dione, melting poing 168°–170°C.

I claim:

1. An improved method for oxidizing primary and secondary alcohols to the corresponding carbonyl compounds which comprises the steps of reacting said alcohols with a lower $C_1$–$C_4$ dialkylsulfoxide and a member selected from the group consisting of aroyl $C_7$–$C_8$ halides, haloaroyl $C_7$–$C_8$ halides, lower alkyl $C_1$–$C_4$ sulfonyl halides, aryl $C_7$–$C_8$ sulfonyl halides, lower alkyl $C_1$–$C_4$ sulfonic anhydrides, tolylsulfonic anhydrides, methoxyphenylsulfonic anhydrides, phalophenylsulfonic anhydrides, and cyanuric chloride in the presence of a solvent for the reactants at a temperature of about −10°C. to −50°C. and recovering said carbonyl compound therefrom.

2. A method in accordance with claim 1, in which the reaction is carried out at a temperature of from −10°C. to −50°C. for a period of from about 3 hours to 25 hours.

3. A method in accordance with claim 1, in which the solvent for the reactants is hexamethylphosphoramide, dichloromethane or a mixture thereof.

4. A method in accordance with claim 1 in which the alcohol is testosterone and the oxidizing agents are dimethyl sulfoxide and p-toluenesulfonyl chloride.

5. A method in accordance with claim 1 in which the alcohol is cyclohexylmethanol and the oxidizing agents are dimethyl sulfoxide and p-toluenesulfonyl chloride.

6. A method in accordance with claim 1 in which the alcohol is yohimbine and the oxidizing agents are dimethyl sulfoxide and methanesulfonic anhydride.

7. A method in accordance with claim 1 in which the alcohol is 1-adamantylmethanol and the oxidizing agents are dimethyl sulfoxide and methanesulfonic anhydride.

8. A method in accordance with claim 1 in which the alcohol is testosterone and the oxidizing agents are dimethyl sulfoxide and acetyl chloride.

9. A method in accordance with claim 1 in which the alcohol is benzoin and the oxidizing agents are dimethyl sulfoxide and methanesulfonic anhydride.

10. A method of preparing methyl ketoresperpate which comprises the steps of reacting methyl reserpate with dimethyl sulfoxide and cyanuric chloride in the presence of hexamethylphosphoramide at a temperature of from about −10°C. to −50°C. for a period of from about 3 hours to about 25 hours and recovering said product therefrom.

11. An improved method of preparing a 17-oxosteroid which comprises the steps of reacting a 17-hydroxysteroid with dimethyl sulfoxide and cyanuric chloride in the presence of hexamethylphosphoramide at a temperature of from about −10°C. to −50°C. for a period of from about 3 hours to about 25 hours and recovering said product therefrom.

* * * * *